Feb. 26, 1935.　　　　C. J. WEEKS　　　1,992,266
INTERNAL COMBUSTION ENGINE
Filed Nov. 14, 1927　　　4 Sheets-Sheet 1

Inventor
Charles J. Weeks
By

Feb. 26, 1935.  C. J. WEEKS  1,992,266
INTERNAL COMBUSTION ENGINE
Filed Nov. 14, 1927  4 Sheets-Sheet 2

Inventor
Charles J. Weeks,
By
Attorney

Feb. 26, 1935.　　　C. J. WEEKS　　　1,992,266
INTERNAL COMBUSTION ENGINE
Filed Nov. 14, 1927　　　4 Sheets-Sheet 4

Inventor
Charles J. Weeks.

Patented Feb. 26, 1935

1,992,266

UNITED STATES PATENT OFFICE 1,992,266

INTERNAL COMBUSTION ENGINE

Charles J. Weeks, Jacksonville, Fla., assignor, by mesne assignments, to Motor Power, Inc., Atlanta, Ga., a corporation of Georgia Application November 14, 1927, Serial No. 233,170

39 Claims. (Cl. 123—119)

This invention primarily relates to internal combustion engines or motors; it more especially involves a charge-forming structure therefor; and it essentially contemplates, in this instance, a unique apparatus for the purpose.

One of the fundamental objects of the invention is materially to economize use of the main supply of fuel (such as gasoline) and improve the combustibility of the components which constitute the explosive-charge for an engine of the general kind specified—and which may be of the four-cycle, two-cycle, or any other, type—and to accomplish this in such manner that appreciable economies are readily effected, efficiency of the engine promoted, increase in power accomplished, and carbonization within the engine prevented or, at least, reduced to a minimum. I thus provide for enomically operating the motor at maximum efficiency per unit of fuel consumed.

Another fundamental object within the contemplation of my invention is to recover, treat and utilize the power and/or heat units, etc.—usually discharged from such an engine—and effect integrating of these with the usual mixture supplied to the engine by an associated mixture-producing device—such as a carburetor—with a resultant explosive-charge possessing characteristics which greatly augment the effectiveness and efficiency of such a charge when exploded within the engine.

Another fundamental object is to intermingle and integrate in the intake-manifold system, the gaseous-mixture from a carburetor (say) with gases carrying no appreciable amount of hydrogen but containing an increased volume of oxygen, the gases comprising, in part at least, the waste portions of the exploded charge—the unspent components of the exhaust—these being collected in or adjacent the muffler and, then, conveyed in gaseous or vaporous form—with perhaps, a certain amount of solids, etc.—to the intake-manifold for intermingling with a fresh gaseous-mixture, the fuel-component of which is greatly reduced by reason of the fact that considerable fuel is derived from the combustibles of the returned gas.

Another fundamental object is to return to the engine-cylinders selected portions of the exhaust or unspent gases, these returned gases being mixed or integrated with other fuel to be introduced therein, the admixture thus formed being then drawn into the cylinders; this object including (in some instances) not only the mixing of the hot gases from the exhaust with vaporized fuel from the carburetor (say) but, also, from the associated crankcase.

Still another fundamental object is, in a novel manner, to treat the exhaust-gases to be reintroduced into the engine or motor, such that they are thereby rendered suitable as fuel, their combustibility materially increased, and their capacity to combine with other components of the explosive-charge improved.

Another object is, by utilizing the unspent gas from the exhaust and treating it in the unique manner herein disclosed and, then, admixing or integrating it with the gaseous-mixture from a carburetor (say), to decrease very materially the amount of (and, in consequence, economize in) fresh fuel which is supplied to the carburetor to run the engine.

Another important object is to collect the hot, unspent gases from the engine-exhaust and, then, in mixing them with the gaseous-mixture from a carburetor (say) utilize more or less of the heat (inherent and/or added) to raise the temperature of that mixture with resultant material increase in its combustibility.

Another object is to proportion the fresh fuel, as such, to the unspent gases and to any air introduced to support combustion, thereby reducing the supply of the fresh fuel and adding to the volume of the working-explosive-charge, with resultant increase in its weight and temperature, which conditions, themselves, cause it to draw less fresh fuel and, besides, the added unspent gases—preferably treated in transit—supplement it.

Another object is to provide an auxiliary combustion-product comprising exhaust-gases, some of which have been treated to effect a change in their characteristics, and which auxiliary product may, at times, also include selected fuel-constituents recovered from the crank-case. This product thus functions not only as a fuel-component but, also, as a heating-medium to add heat to the gaseous-mixture from the carburetor or other mixture-producing device.

Another object contemplates the cycling of the combustible components of the unspent gas of the exhaust in such manner that, by resubmitting the same in a more or less changed character and admixed with fresh fuel—as from a carburetor—to the explosive action of the motor, they are eventually more or less entirely consumed, thus effecting a substantial decrease in the amount of fresh fuel required to meet the demands of the motor, with consequent material saving in cost of operation thereof.

Still another object is to provide a structure—in the nature of a circulatory system—in communication with the intake and exhaust passages of the engine, whereby the latter does not exhaust to the atmosphere but the exhaust is directed to a useful and economical purpose; that is, the unspent gases of the exhaust are cycled through the engine and its adjunctive devices and, by reason of incidental treatment to which it is preferably subjected en route, the combustibility of such gases is substantially augmented and improved, with resultant efficiency of the explosive-charge when the gases become a component thereof.

Another object is to provide, in conjunction with such a circulatory system, a superheater-device or reheater—in the nature of a retort and comprising an elongated chamber disposed in the path of the hottest column of the outflowing exhaust-gases immediately after being exhausted from the combustion-chamber and preferably before reaching the muffler—whereby a selected portion of the exhaust-gas may be subjected to treatment such that its mechanical and, perhaps, its chemical character and characteristics are changed; that is to say, the unconsumed products of combustion of the motor, or at least some of them, are directed through the hottest part of the exhaust-system so that such products pass, in consequence, through a zone of intense, flaming heat, and are thereby converted, after which they are directed into the intake-manifold with substantially no intermediate cooling or chilling.

Another object is selectively to segregate different portions of the exhaust-gas and reintroduce these portions, separately, into the intake of the motor, there to mix more or less with the fresh gaseous-mixture from an associated mixture-producing device—such as a carbureter; at least one of the selected portions so reintroduced being subjected en route to a superheating or reheating treatment by and within the zone of the effective action of the flaming exhaust-gases from the motor; another selected portion untreated (so to speak) being also conducted to the intake of the motor and admixed therein with the superheated or reheated exhaust-gas and the gaseous-mixture, the temperature of the latter as well as of the untreated exhaust-gas being substantially increased (with consequent improvement in their combustibility) by the heat-exchange effected by the integrating operation.

Another object is to provide means for controlling the introduction of the gaseous-mixture and of the treated and untreated exhaust-gases, such that their supply to the intake of the motor is more or less predeterminately governed and, preferably, in accordance with the requirements of the motor, and in such manner that, as the supply of the gaseous-mixture is in inverse ratio to the supply of the exhaust-gases, the proportions of the mixture are materially changed.

Another object is to provide a simple but effective structure by which the explosive-charge is introduced into the engine or motor by the normal operation thereof, not only without detracting at all from its power but, rather, effecting a substantial increase in power: In consequence of this increased power of the motor, more effective suction in the intake-manifold is promoted, with the result that it will act to induce a rapid current through the system and draw in a steady flow, in predetermined volume, of unspent gas from the exhaust and fuel-vapors from the crank-case; these gases and vapors meeting and integrating in the intake-manifold, the vapors being heated by the hot gases, the latter also augmenting the heat of the gaseous-mixture whose air-component will have been preheated. Hence, my inventive-concept contemplates supplying the charge with fuel from the exhaust-gases and crank-case as well as from the carbureter, advantage being taken of the heat existent in the gases to effect, during the integrating operation, a preheating of the incoming mixture fed from the carbureter and crank-case-preheated air to support combustion being drawn from the atmosphere and, largely, through the carbureter.

Another object is to subject the exhaust-gases, while en route to the intake-passage of the motor, to a pressure-raising action preliminary to a selected portion thereof being superheated or reheated to change their character before intermingling with the fresh gaseous-fuel supplied by the carbureter.

Another object is to promote, rather than to prevent, a predetermined degree of back-pressure within the circulatory system, whereby cushioning of certain strokes of the pistons, and of other motor parts, is effected; in other words, I aim to utilize the presence of certain media of the explosive-charge that may be under pressure to develop more or less back-pressure on the motor and, in consequence, cushion its moving parts, any seeming loss incident to such back-pressure being compensated for by increased power in the motor due to the more powerful explosive-charge introduced thereinto.

Another object is to divide the exhaust-gases into a plurality of portions, columns, or bodies and—then or before—compress them to a predetermined degree to increase their pressure, they then being withdrawn, more or less selectively, from the associated muffler (or equivalent device) of the system: One portion, while still under pressure, may then be subjected to a superheating or reheating action to change its character mechanically—and, perhaps, chemically—after which it is conducted to the intake-manifold of the motor. Another portion, also under pressure but, preferably, in larger volume, is conducted more or less directly to the manifold, to be there brought into a mixing or integrating relation with the gaseous-mixture and the superheated or reheated exhaust-gases and, also, in some instances, but not necessarily so, with selected contents withdrawn from the crank-case of the motor.

Another object is to produce a unique type of explosive-charge including, (1) a gaseous-mixture supplied by a mixture-producing device (such as a carbureter) and one or more components of which mixture is or are more or less preheated, (2) a superheated or reheated body of exhaust-gas which (preferably) is under a predetermined pressure, (3) a second body of exhaust-gas also (preferably) under pressure, and (4) selected portions of the contents of the engine crankcase: This charge has certain characteristics and attributes which, when exploded, tend to effect more or less complete combustion thereof and, in consequence, greater efficiency of the motor and economy in its operation.

Another object is to effect a withdrawal of selected portions of the contents—moisture, heat, vaporous elements, fuel-vapors, residue of gases, etc.—of the associated crank-case of the motor and (in combination with fresh air drawn from the atmosphere) to conduct the resultant of the mixture thereof to the intake of the motor, there to intermingle and more or less admix with the gaseous-mixture from the carbureter and/or with the superheated or reheated exhaust-gas and/or with the untreated exhaust-gas cycled through the circulating system which is in communication with the intake and exhaust passages of the motor.

The invention possesses other and further objects and features, all of which will be more or less self-evident and/or will be set forth in the following description:

In the accompanying drawings, constituting the illustrated part of disclosure of my inventive-concept, I have shown—more or less schematically—one of several possible embodiments and utilizations of my invention; it being understood that this is, and is intended to be, merely illustrative and, further, that other possible practical embodiments and utilizations of my concept are possible and that even the embodiment herein revealed is susceptible of a wide range of modification and/or variation without departing from the spirit of the invention or sacrificing any of its underlying principles or salient features.

Motor and general supporting and adjunctive structures

Referring to the drawings, the reference-character 1 is noted as designating, in general, the chassis of an automobile. On this is mounted, in the usual way, an internal combustion engine or motor 2, which may be of the usual type, having the customary crank case 3. With the motor is operatively associated a mixture-producing device 4, in this instance shown as a carbureter, the latter being constructed and operating in accordance with the principles revealed in United States Patent No. 780,949, dated January 24, 1905. It is to be understood, however, that this showing is merely an exemplification, and that any other type of mixture-producing device may be employed.

It is also to be understood that my charge-forming structure, as herein disclosed, may be equally well employed in conjunction with any appropriate type of internal combustion motor, mounted in any suitable type of vehicle, in a boat, on an aeroplane, etc., or for the generation of power for any purpose.

The motor 2 is provided, as usual, with intake and exhaust passages (not shown), the former being in communication with an intake-manifold 5, and the latter with an exhaust-manifold 6, the latter continuing into an exhaust-conduit or pipe 7.

Associated and in communication with the manifold 5 is a gas-intake 8 which, in this instance, includes a main member 8ª and two spaced-apart parallel members 8ᵇ, 8ᵇ, the latter projecting into or through the side wall of the motor.

Fuel and air supply structure

The mixture-producing device, whatever its type, may be supplied with fuel—such as gasoline, other forms of hydrocarbon fuel, and even non-hydrocarbon fuel—from a fuel-tank 9, preferably located, as usual, at the rear of the chassis, and between it and the carbureter (if the latter is utilized to produce a gaseous-mixture for the motor) extends the customary pipe or gas-line (not shown).

The air, in this instance, is introduced into an intake 10 of the carbureter through a conduit 11 which, in turn, is connected to an air-heater or "stove" 12 that derives its heat in any appropriate manner, as from an inclosed section of the exhaust-manifold 6 of the engine.

The gaseous-mixture produced in and supplied from the carbureter is conducted into the intake-manifold or passage 5 of the engine, in the usual manner.

The intake and exhaust passages, manifolds, and conduits may be of usual (or any appropriate) type and form having capacity to supply adequate quantities of the explosive-mixture to the motor and to exhaust the products of the explosion therefrom.

Circulatory system

The intake and exhaust passages, manifolds and conduits of the motor constitute some of the components of what I herein, for the purposes of convenience and ready reference, designate a circulatory system, the function of which is to contribute toward cycling the exhaust-gases from the motor back to its combustion-chamber and there again subject it to explosive action of the motor. The other components of the system include a muffler, an exhaust-equalizer, and pressure-controlling devices, gas-conduits, and a superheater, and which I will now describe:

*Muffler.*—Preferably and as shown, the exhaust-manifold is (through the pipe 7) in operative communication with a gas-dividing and trapping-device 13 revealed (in this instance) in the nature (in part) of a muffler.

Figure 6:
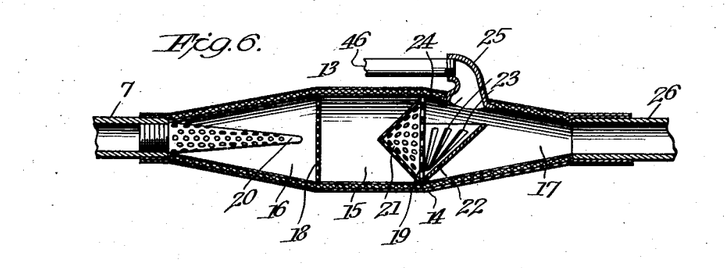
Fig. 6 is a view in vertical, longitudinal section (and considerably enlarged) of a muffler-type of device, and certain adjunctive parts, constituting desirable components of the aforementioned circulatory system.
Figures 7, 8, 9, 10:
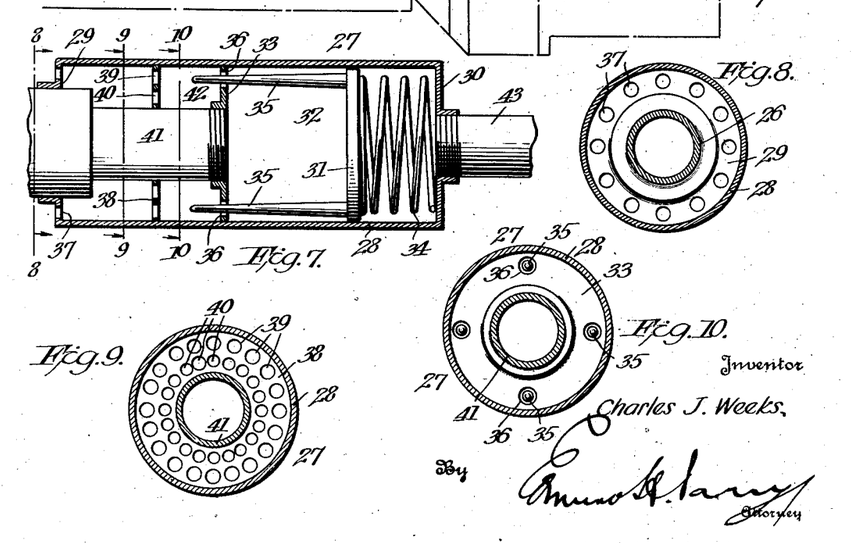
Fig. 7 is a similar view of a gas-controlling device associated with the muffler and, likewise, constituting an important component of the system.
Fig. 8 is a view in transverse section on the line 8—8, Fig. 6, and looking in the direction of the arrow indicated therein.
Figs. 9 and 10 are views similar to Fig. 8, the respective sections being on the lines 9—9 and 10—10, Fig. 6, and looking in the direction of the arrows indicated therein.
Figure 11:
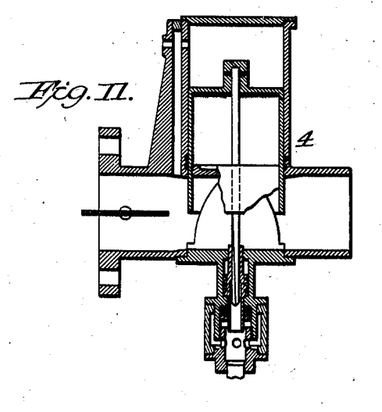
Fig. 11 is a view in section, enlarged, of a carbureter of the type illustrated in the preceding views.

It comprises an open-ended casing 14 (Fig. 6) which includes three chambers, that is, a central cylindrical chamber 15 and two conical end chambers 16 and 17 spaced by perforated partitions 18 and 19, respectively. Extending into and housed within the end-chamber 16 is a conical, perforated element 20 forming an extension of the exhaust-conduit 7. Within the chamber 15, also, is a conical, perforated element 21, this being disposed on one side, and being approximately of the dimensions of the partition 19. The perforations in the partitions 18 and 19 and in the conical elements 20 and 21 are, preferably, staggered in relation to each other so as to cause the exhaust-gases passing through the muffler to travel a more or less tortuous path and, also, to effect a breaking up thereof into small bodies.

Mounted on the partition 19, and at the side thereof opposite the conical element 21 and, thus, housed within the chamber 17, is a deflector-element 22, preferably having a plurality of ribs or corrugations 23, and mouthing upward toward an aperture 24 in the upper portion of the chamber 17. Extending outwardly from the chamber 17 and in communication with the aperture 24 is an angulated coupling-element 25, for a purpose presently to be explained. The structure just described and including the chamber 17, the deflector-element 22, etc., embraces what I may, for the purpose of identification, designate a gas-trap, in that a certain portion of the exhaust-gases are momentarily trapped in the chamber whereupon more or less of a selected body thereof is divided from other portions and passes out of the chamber through the coupling-element 25.

*Exhaust-equalizer and pressure controlling device.*—Extending from the rear end of the muffler 13 and in communication with the chamber 17 thereof is a short conduit 26 which, in turn, connects and is in communication with a cylindrical member 27 which, for purposes of identification, I may herein designate an "exhaust-equalizer and pressure-controlling device", since it contributes more or less to equalize the flow of exhaust-gases through the circulating system and, also, to control the pressure to which the gases are therein subjected, in a manner presently to be explained. This device is more particularly disclosed in my application Serial No. 233,169, filed November 14, 1927.

The member 27, as shown more clearly in Figs. 7 to 10, inclusive, includes a casing 28 and ends or heads 29 and 30, and houses what is, in form, a piston or diaphragm 31. This has reciprocatory movement in a chamber 32 located at one end of the casing and formed in part by a partition 33 and acts, in one direction, under the influence of a spring 34 within the chamber.

Projecting from the diaphragm 31 is a series of tapered valve-elements 35 (Figs. 7 and 10), each of which extends through and works in an aperture 36, and which at one point is of greater diametral dimension than the smallest diameter of the element 35, and at another point of smaller diametral dimension than the larger diameter of such element. In consequence, the element serves, when in one position, to open the aperture for the passage of exhaust-gas, etc., flowing through the device and, when in a different position, to close the same, the passage therethrough being graduated in accordance with the position of the element in the aperture.

The casing-head or end 29 is provided with a series of circularly arranged perforations 37 (Figs. 7 and 8) for exhausting certain contents of the casing 28 into the atmosphere.

Intermediate the perforated casing-head 29 and the apertured partition 33 is a partition or baffle 38 (Figs. 7 and 9) provided, preferably and as shown, with two series of circularly arranged perforations 39 and 40, respectively, these being staggered and out of alinement with the perforations 37 in the head 29 and with the apertures 36 in the partition 33.

Extending from the conduit 26, and within the casing 28, is a short pipe 41 which projects through the baffle 38 and is threaded into the partition 33. Thus, the conduit 26 is in communication with the chamber 32 of the casing 28, the chamber being, in turn, in communication with a chamber 42 formed by the partition and the baffle, but which communication is controlled by the valve-elements 35 working in the apertures 36 in the partition.

While the disclosed controlling-structure appears preferable, nevertheless any appropriate type of release-valve or device may be utilized.

*Exhaust-gas conduits.*—By reason of the provision of the aforementioned gas-dividing and trapping-devices, a plurality of portions or bodies of exhaust-gases that have reached the muffler are more or less selectively created: One of these passes out of the muffler through the coupling 25, while the other portion passes from the muffler through the conduit 26 into the equalizer-device 27. In the device 27 the selected body is conducted into the chamber 32 and, according to the volume and pressure of such body, operates the diaphragm 31, either to cause it to close the apertures 36 in the partition 33, whereupon the gas passes around the periphery of the diaphragm, out of the chamber 32, and into an elongated conduit 43; or, if the diaphragm has been actuated so that the apertures 36 are more or less open, a certain part of the contents of the chamber 32 will escape therefrom into the chamber 42 and, through the baffle 38 and perforated head 29, into the atmosphere.

Leading out of the equalizer-device 27 is the aforementioned elongated gas-conduit 43 which extends to and is in operative communication with the gas-intake 8. Thus, it will be manifest that a certain portion of the exhaust-gas and unconsumed products of combustion which have been exhausted from the motor pass into the muffler and, thence, into the conduit which conducts them into the intake-manifold. There they will be mixed with the fresh gaseous-mixture supplied to the manifold by the mixture-producing device 4. By reason of their high temperature, these products will impart considerable heat to the mixture and, in addition, will supplement the explosive-mixture that is supplied to each of the combustion-chambers of the motor.

Figure 12:
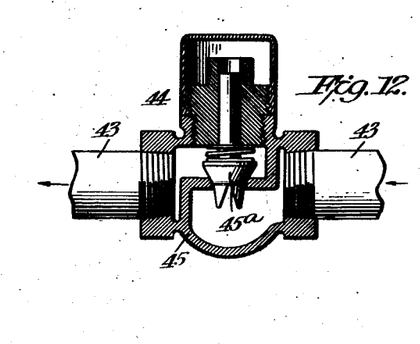
Figs. 12 and 13 are enlarged views, in section, of two gas-controlling valves incorporated in the circulatory system.

Intermediate the terminals of the conduit 43 is a controlling-device 44 which, preferably and in this instance, is a balanced valve that includes a casing 45 (Fig. 12) and a light, spring-actuated valve-member 45ª loosely disposed therein and operating under the influence of the suction of the motor—as developed back through the manifold to the valve—or under the influence of the pressure of the passing gases. That is to say, the valve, by the force of gravity, normally remains seated; but, when the motor is in action, its suction, or the pressure which it develops in the gases, lifts the valve-member more or less from its seat so that, at times, it may be said to float within the casing. By this means, the flow of the gases, etc., through the conduit 43 is automatically governed in exact accordance with the action and requirements of the motor. By reason of the character of the valve thus employed, and the light weight of the valve-member thereof, it is readily operated to permit a predetermined volume of the exhaust-gases to be conducted through the conduit 43 and admit them to the motor. This volume, however, varies at times to meet the working requirements of the motor, as already mentioned.

*Superheater or reheater.*—Leading from the coupling-member 25 on the muffler 13 is a gas-conduit 46, preferably of somewhat smaller capacity than the gas-conduit 43. The conduit 46 is, preferably and as shown, in three main sections 46$^a$, 46$^b$ and 46$^c$. The section 46$^a$ overlies a major portion of the muffler and a part of the exhaust-pipe and, as these instrumentalities retain considerable heat, they transmit such heat (or at least some of it) to the section 46$^a$ and, thus, this section becomes in effect a preheater of the contents of the conduit during their passage through that section.

The section 46$^b$ is disposed within a portion of the exhaust-pipe and is, thus, subject to the intense heat—estimated to be 750° to 1000° F.—of the flaming gas in the pipe, and which heat is especially effective on the preheated contents of the section 46$^b$. By reason of its position within the zone of the flaming gas, etc., and the fact that such gases, etc., are reheated to such a degree that it may be said that, in practical effect, they are superheated, I have, for purposes of identification, herein designated this part of the structure a "superheater", marked it S, and described the action thereof as "superheating or reheating". In a companion application of mine, Serial No. 233,169, filed November 14, 1927, I have more particularly described and claimed this superheater structure.

Preferably and as shown, the section 46$^b$ is coupled, at 47, to the section 46$^a$, outside of the exhaust-conduit 7, is of a length nearly that of the conduit, and is disposed in that portion of the conduit wherein the products of explosion within the motor are still flaming and, thus, at the intense heat already specified.

Near the juncture of the pipe with the exhaust-manifold, the section 46$^b$ projects through the conduit and is there connected to the third section 46$^c$ which, in turn, is tapped, at 48, into the gas-intake 8. Thus, it will be understood that when a certain portion of the unspent gases are acted on within the gas-trap in the muffler, that portion is by the deflector 22 directed into the coupling-member 25, whence it passes through the section 46$^a$ and, as already explained, is therein more or less preheated; thence, it passes into the superheater S and is thereby superheated and changed in its constituents, character and characteristics; thence, it passes into the section 46$^c$ and, finally, into the gas-intake and intake-manifold, there to intermingle, more or less admix with, and integrate with the body of exhaust-gas which has been conducted thereto through the conduit 43 and, also, with the gaseous-mixture from the carbureter or other mixture-producing device, with the resultant formation of a unique type of explosive-charge for the motor.

Figure 13:
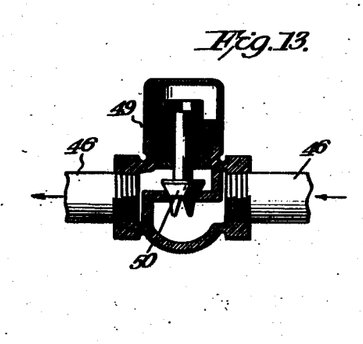

As it is desirable to control the passage of the superheated or reheated body of exhaust-gases flowing through the conduit 46 and, thus, regulate the quantity thereof introduced into the intake-manifold, I have provided the conduit—preferably on the section 46$^c$—with a balanced-valve 49 (Fig. 13) of a construction somewhat like the valve 44, and functioning in a somewhat similar manner. In this instance, however, the valve-member 50 of this device 49 is not provided with a spring, as in the device 44, because the volume of gas passing therethrough is less and it is not generally necessary to augment gravity to give the member a normal tendency to remain seated. It, however, is influenced by the action of the motor, similar to the valve 44.

*Pressure production*

From the foregoing, it will be perceived that, in the particular manner of connecting up the muffler with the intake-manifold—through the conduits 43 and 46 and the adjunctive parts—I have provided what is, in practical effect, a closed system; that is to say, my circulatory system provides practically a closed passage for the stream of exhaust-gases from the motor through the exhaust-manifold, conduit, and muffler and, thence, back to the motor through the conduits 43 and 46 and superheater S. As a result, the successive impulses or explosions of the motor and the consequent action of the exhaust-stroke thereof develops a pressure within the system which, by reason of the function of the muffler and its adjunctive equalizer 27, builds up a pressure in the gases themselves such that, while they are en route to the intake-manifold, they are maintained under such pressure even up to the time that they admix or integrate with other contents of the intake-manifold and, also, afterwards. It follows, therefore, that the system provides a medium for subjecting such gases to pressure and, also, for maintaining them under pressure, preferably until they reach the intake-manifold, or even beyond that point, if desirable.

It also will be noted, particularly, that the stream or portion of exhaust-gas which passes through and is acted upon by, the superheater S is under pressure when treated thereby. Thus, it will be recognized that at least one body or portion of the exhaust-gases exhausted from the motor is subjected to superheating treatment while under pressure, whereby the resultant thereof is unquestionably a type of gas which is quite unique. I believe I am the first, therefore, not only to propose a circulatory-system for handling exhaust-gases of an internal combustion engine in a manner that they cycle from, back to, and then again through, the motor—perhaps several times—but the first, also, to superheat or reheat such gases en route and, preferably, under pressure, such that their constituent character and mechanical and chemical characteristics are substantially changed, these results being due, to a greater or less extent, to the fact that the superheating or reheating is preferably effected while the gases are under pressure.

It is to be understood that the action of the equalizer 27 is such that a pressure of a predetermined degree—of twelve pounds per square inch, say—may be developed in the gases. In other words, the spring 34 which controls the diaphragm 31 is such as to permit a building up of pressure on the contents of the casing 28 to the specified degree. If the pressure, however, exceeds the predetermined degree, the spring is of a character to yield and permit the diaphragm and its valve-elements 35 to move more or less to open the apertures 36, this action permitting escape of enough of the contents of the casing to allow the pressure to drop down to what the equalizer 27 has been set for. When sufficient of these contents have thus been liberated into the atmosphere to restore the (twelve-pound) pressure in the casing 28, the spring 34 will act to cause the diaphragm to close said apertures and, thus, the casing. In this way, there is an equalizing of the pressure within the system; hence, I designate this device an "equalizer".

Another desirable condition to be noted as a resultant of the circulatory-system is that of back-pressure on the motor. Ordinarily, this is regarded as undesirable in that it reduces the power of the motor; but, in my structure, inasmuch as sufficient additional power is developed in the motor, by reason of the utilization of treated exhaust-gases, etc., I thereby more than overcome any losses that would otherwise ensue, and I gain the decided advantage of effecting a cushioning on the parts of the motor, whereby vibration, noise, etc., are reduced to a minimum.

A further desirable condition resulting from the maintenance of a controlled pressure on the exhaust is the reduction of the vacuum in the intake manifold. In other words, where, in a closed circulatory system, a portion of the fuel is supplied to the intake manifold under pressure, and where there is, thus, a more or less constant back-pressure on the motor, it follows necessarily that the vacuum in the intake manifold is correspondingly reduced. Thus, there results a condition which I have described as "high pressure and low vacuum". This condition is that which provides the advantageous cushioning of the reciprocating parts of the motor and constitutes an importat result of the use of my method.

It will be understood, also, that the action of the controlling or balanced valves 44 and 49 is such as to contribute toward maintaining this back-pressure, their functioning being such as to govern a predetermined quantity or volume of the gases to pass therethrough and, thus, as the gases are under pressure, the valves will, to a certain extent, be influenced by such pressure to open or close in accordance with what the working requirements of the motor and the system may demand.

*Utilization of vaporous crank-case contents*

Figure 1:
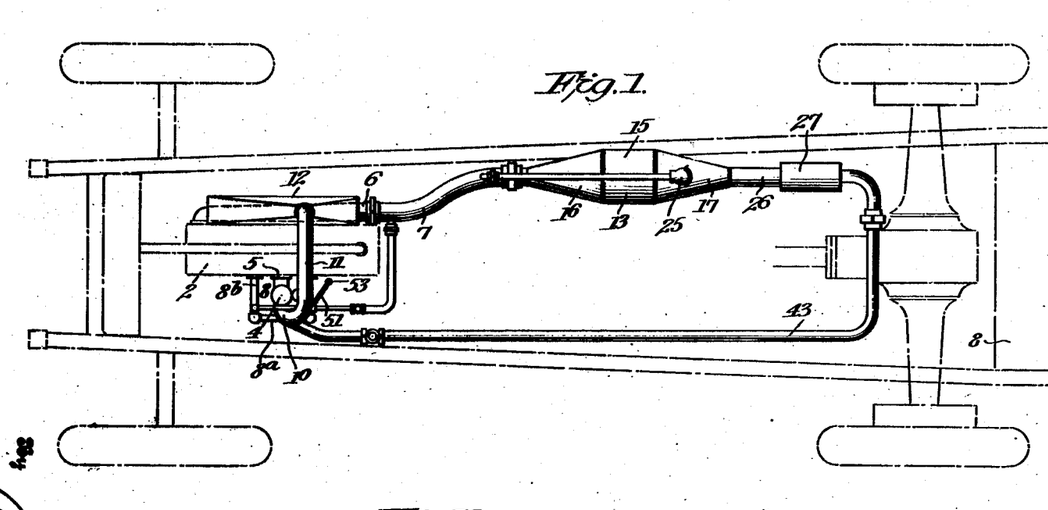
Figure 1 is a view in plan (somewhat fragmentary) of the main portions of an automobile-chassis, and includes a fuel-supply tank at one end thereof, an internal combustion engine or motor adjacent the other end, a mixture-producing device—here illustrated as a carbureter—juxtaposed to the motor, and my improved charge-forming structure interposed between and in operative communication with said engine, tank, and mixture-producing device and involving what I herein designate a "circulating-system"
Figure 2:
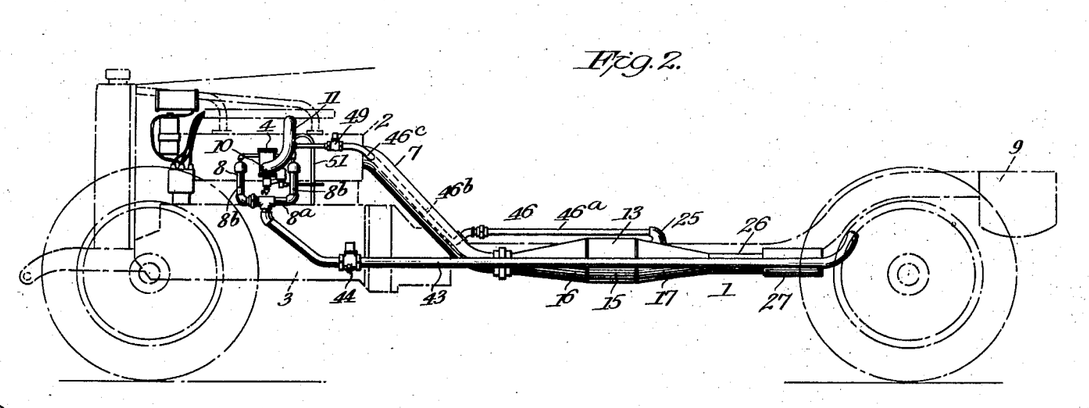
Fig. 2 is a view in side elevation thereof—partly in section and, also, somewhat fragmentary—looking from the left side of the chassis as seen in Fig. 1.
Figure 5:
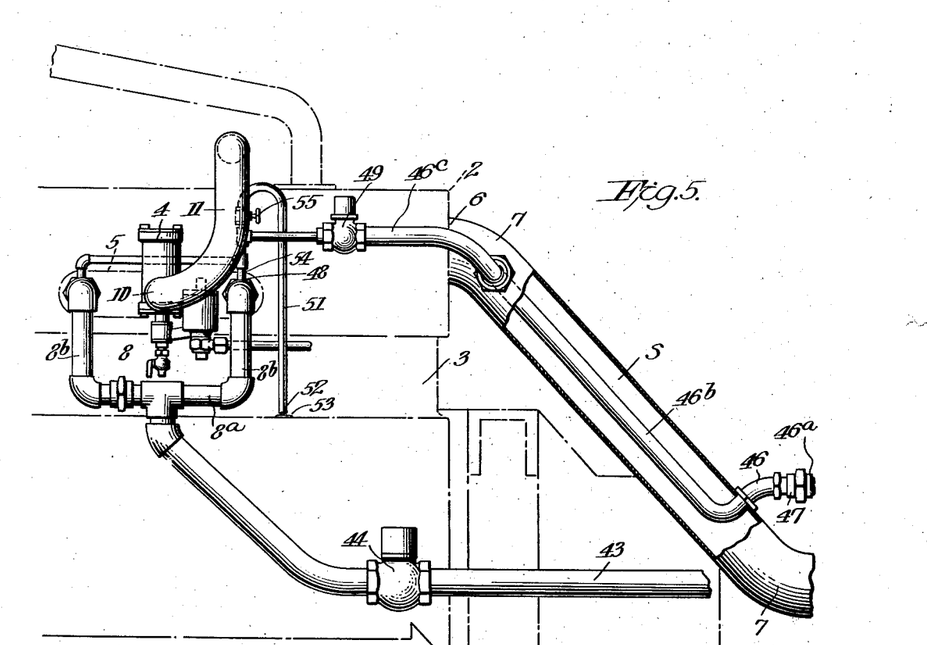
Fig. 5 is a fragmentary view, on a somewhat larger scale, of the construction as illustrated in Fig. 2, and showing certain parts and features of my structure associated with and in operative combination with a carbureter.

In the practical operation of the structure already described, I have found it more or less advantageous to withdraw certain of the vaporous and heated contents of the crank-case, introduce them into the intake-manifold, and there admix or integrate them with the gaseous-mixture from the carbureter and with the exhaust-gases cycled thereinto by my circulatory-system. To that end, I provide a conduit 51 (Figs. 1, 2 and 5) which has one extremity 52 disposed adjacent the upper end of a breather 53 which, as usual, communicates with the interior of the crank-case. The other end 54 of the conduit is, preferably and as shown, tapped into the exhaust-conduit 46 which, in turn, communicates with the intake-manifold. The end 52 of the conduit is so disposed in relation to the mouth of the breather that, due to the suction developed through it by the action of the motor, it will withdraw the fumes, gaseous constituents and warm air from the crank-case and, at the same time, will draw in fresh air (through the end 52) from the atmosphere in quantity to give to the withdrawn contents the characteristic of fuel of reasonably good combustibility.

At times, it is desirable to regulate the quantity of these withdrawn contents; hence, I provide a valve 55 on the conduit 51. This type of valve may also be utilized, if desirable, in the other conduits herein revealed.

By reason of the fact that, as shown in this instance, the selected crank-case contents are introduced into the conduit 46 which conducts the superheated or reheated exhaust-gases to the intake-manifold, those selected contents integrate therewith before entering the intake-manifold, in consequence of which they absorb a high degree of heat therefrom and, also, are probably changed in their character, by mechanical and/or chemical action or reaction resulting from the integrating functioning of the manifold.

Figure 3:
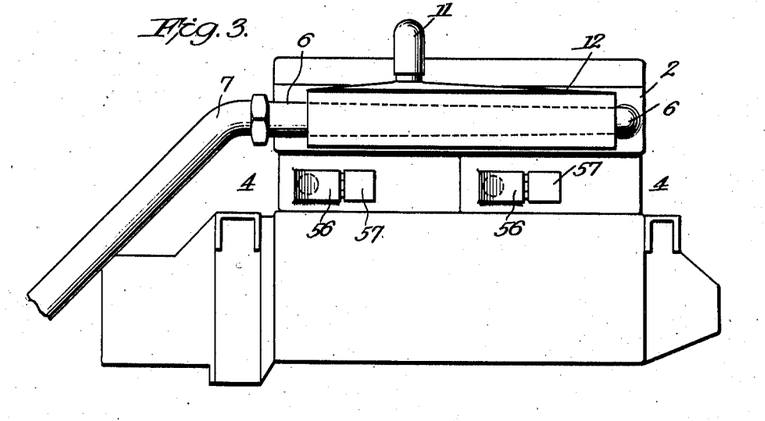
Fig. 3 is a similar but even more fragmentary view of the opposite side.
Figure 4:
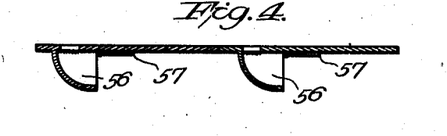
Fig. 4 is also a fragmentary view in longitudinal, horizontal section, on the line 4—4, Fig. 3.

*Crank-case cooling device.*—To facilitate the withdrawal of certain of the vaporous contents of the crank-case by the construction already described, and to effect a cooling of the oil within the crank-case and the consequent maintenance of a relatively cool motor, I may, in some instances, provide the same with means for introducing air from the atmosphere into the crank-case. Preferably and as shown in Figs. 3 and 4, this involves mounting one or more air-ducts 56 at the side of the motor above the crank-case, these communicating with the latter, and being in the path of the motor-fan so that, as the vehicle in which the motor is mounted moves forward, air is forced by either or both of these actions into the air-ducts 56 and, thence, into the oil-chamber of the crank-case, cooling the oil therein; this construction being similar to that disclosed in my patent No. 1,497,418, dated June 10, 1924, for an "Oil cooling device". The passage of the air through the ducts may be controlled by hinged closures 57, if desirable.

*Operation*

The operation and cooperation of the various components of the system, aforementioned, and its adjunctive parts, will be more or less manifest from the foregoing. Assuming that an explosion in the motor has occurred and that the products of that explosion, in the form of exhaust-gases, unconsumed solids, etc., have been discharged by the motor into its exhaust-passage 6 in the usual manner and, thence, into the exhaust-conduit 7, these exploded products will, for a considerable distance if not throughout the entire length of the conduit, be aflame and, thus, carry a very high percentage of heat-units—of a temperature approximately from 750° to 1000° F. This intense heat will necessarily greatly raise the temperature of the superheater S and thereby effect a treatment of the contents of the section 46b. The action is that, not merely of heating, but of superheating; and the resultant of such superheating is the conversion of the gaseous and other contents into a different type of gas or product, the exact character and characteristics of which are not yet definitely known to me.

It may here be stated that, generally speaking, an explosive-charge introduced into the cylinder of an internal-combustion power-device, preliminary to the charge-combustion, comprises in the main atmospheric-air and hydrocarbon, the latter being usually in the form of vapor, the charge generally being produced by integrating the hydrocarbon and air contents as the air is drawn toward the cylinder in what is known as the suction-stroke of the cycle of operation. Now, after compression and ignition of the charge, certain known chemical reactions and changes take place by reason of the explosive action brought about by ignition of the integrated components. For instance, it is known that the carbon-content of the hydrocarbon and a portion of the oxygen-content of the air react into carbon dioxid ($CO_2$), while the hydrogen-content of the hydrocarbon reacts with the oxygen-content of the air to produce a form of $H_2O$, the nitrogen-content of the air being practically inactive. There are, of course, some minor components present in the hydrocarbon and air contents, and the explosion effects more or less change in these minor components.

Now, an analysis of the contents of the muffler of my system discloses the unquestionable fact that certain of the usual constituents of exhaust-gases found in mufflers, under similar working conditions, are eliminated entirely, while others are varied in their volume. The following comparative tabular analysis indicates this, the volume being expressed in percentage:

*Usual muffler contents*

| Ratio of air to gases: lbs. | Hydrogen | Methane | Carbon monoxid | Oxygen | Carbon dioxid |
|---|---|---|---|---|---|
| 13.5 | 1.6 | 0.3 | 3.7 | 0.7 | 12.8 |

*Weeks' muffler contents*

| | | | | | |
|---|---|---|---|---|---|
| 16.7 | 0 | 0 | 0.1 | 1.6 | 11.9 |

It will thus be noted that, in my muffler-contents, there is no hydrogen or methane; and that the volume of oxygen is substantially increased.

I am, of course, aware of the fact that it has heretofore been proposed to utilize the exhaust-gases of a motor as fuel and, also, to utilize the heat of the gases returned to the motor for re-use therein; but I know of no instance where such gases are subjected to the action of a stream of intensely hot gases and unspent products of combustion, as here proposed, to raise them to an exceedingly high temperature, amounting, in effect, to superheating, strictly speaking. The unconsumed products of combustion may be said to be "cooked" in the superheater, whereby they are thoroughly gasified. Just what the mechanical and/or chemical effect of the superheating on the gases is, I am not at present prepared to state, as already indicated.

By reason of the fact that the contents of the superheater are under pressure—twelve pounds to the square inch, say—the action of the superheater may amount to, or be in the nature of, "cracking". In other words, inasmuch as pressure and a relatively high heat are concomitants of gasoline "'cracking", and as the contents of the superheater are—in part at least—unconsumed products of combustion that are developed from a fuel which, if of a hydrocarbon form, would lend themselves to such a "cracking" treatment, it would seem that, on known conditions and results, the volatility of the contents will have been augmented by such treatment. Be that as it may, the superheated body of exhaust-gases, etc., which pass through the superheater will necessarily have undergone a substantial change, so that when they enter the intake-manifold, they exist as a treated body, such that, both as a fuel and as a heating-medium, they will almost inevitably effect a change in the other contents of the manifold, the exact nature of which change I am also unable at present to state. Observed results, however, incline me to the belief that they supply to the combustion-chamber a character of explosive-charge which is in a highly volatile condition, practically dry, and of high efficiency. This results in a material decrease in the requirement of the motor for fresh fuel, as indicated by the fact that, in practical tests and under unquestionable conditions, the explosive-charge has been demonstrated to give a mileage, per each pint of fuel—commercial gasoline—used, far in excess of anything heretofore attained under identical conditions, so far as now known to me. In other words, a car equipped with the structure herein disclosed, has demonstrated in a practical way that, under usual running conditions of such a car, a heretofore unattainable mileage for each gallon of fuel used, can be attained. The unquestionably unique results resulting from the system disclosed appear, therefore, to be due, in a large measure at least, to the treatment of the exhaust-gases, such treatment involving their being superheated while under pressure.

Resuming, now, the course of the outflowing products of the exploded charge: They will, after passing through the conduit 7, enter the muffler 13, being delivered thereinto through the conical, perforated element 20, which has a tendency to split the stream or mass up; then these pass through the perforated partition 18; thence through the second conical element 21; thence (some of them) into the deflector-element 22 which directs them into the coupling 25, while other portions pass over and around that element and into the short conduit 26. By reason of the fact, already mentioned, that the circulatory-system is of a closed type, and permits the development of pressure in the exhaust gases, it will be understood that the streams of the contents of the muffler which are released therefrom, either into the coupling 25, or into the conduit 26, are under pressure, and continue their respective courses under pressure. The chamber 17 of the muffler in which is mounted the deflector-element 22, and which I have herein designated a "gas-trap", effects a division of the exhaust-gases, which have entered the muffler, into two portions or streams, one of these (under pressure) flowing out of the chamber 17, through the coupling 25, and into the conduit 26; while the other stream (also under pressure) flows out of the chamber, through the conduit 26, and into the gas-equalizer 27, where it is again divided, more or less periodically. The major portion, however, passes through that device into the conduit 43, while a small quantity is discharged from the device into the atmosphere, according to the position of the valve-elements 35 in respect to the apertures 36 in the partition 38 of the device: Those portions of the exhaust-gas which are released from the chamber 32 of the device through the apertures 36 are gradually released through the baffle 38 and, eventually, through the perforated head 29 into the atmosphere; the baffle 38 and perforated head contributing to reduce to a minimum and deaden any noise of the exit of the gas from the device.

The stream of gas which has passed into the conduit 43 eventually reaches the balanced-valve 44 which, by reason of its construction (as already described) permits the passage therethrough of the requisite volume of the contents of the conduit into the intake-manifold.

In the meantime, the stream of exhaust-gas which has passed from the muffler into the conduit 46 is conducted through the section 46ª which imparts to it a certain amount of heat derived from its juxtaposition to the muffler and by which the temperature of the contents of that section may be more or less maintained. Following this step, the gas passes into the superheater S and is thereby treated in the manner and with the results already described, after which it is delivered into the intake-manifold and admixes or intermingles therein with the other body of the exhaust-gas which has been introduced into the manifold through the conduit 43.

While these operations are being performed, in connection with the two bodies of exhaust-gases, the mixture-producing device—the carbureter, say—will have delivered to the intake-manifold a fresh supply of gaseous-fuel which admixes or intermingles with the two bodies of exhaust-gases and, moreover, receives therefrom a considerable amount of heat.

By reason of the fact that the integrated exhaust-gases which are utilized in this connection are in the nature of fuel, they, in consequence, themselves supply the motor with an explosive-charge of considerable volume. It is known that they are of such volume and character as very materially to reduce the volume of fresh fuel drawn from the carbureter, such that the specified high mileage, per gallon of gasoline, indicates that a relatively small quantity of gasoline is drawn through the carbureter by the motor to meet its requirements for fresh fuel.

While the conduits 43 and 46 and the carbureter are functioning to supply the intake-manifold with the components for the explosive-charge, certain portions of the contents of the crank-case—selected vaporous contents thereof—are, after being mixed with air from the atmosphere, conveyed by the conduit 51 and are eventually admixed or integrated with the contents of the manifold, have their temperature increased by reason of coming into contact with the hot and heated streams of exhaust-gases, and in this condition become a part of the explosive-charge. These vaporous contents from the crank-case may not change the character or characteristics of the other contents of the intake-manifold; but they apparently constitute a fuel which becomes a part of the explosive-charge and, thus, further reduce the draft on the carbureter for fresh fuel.

To what extent the exhaust-gases are reintroduced into the motor is not yet entirely known to me; that is to say, it has not yet been determined how many times these exhaust-gases pass through the circulatory-system: but, to whatever extent their character or characteristics require that they shall be reintroduced, before being released into the atmosphere, the circulatory-system provides for, and has the capacity of, cycling the gases therethrough, once or any number of times requisite. By reason of the treatment which certain portions of these gases receive in transit from the exhaust to the intake-manifold, and the probable consequent change in their character, it is believed that the explosive-charge—comprising whatever fresh gaseous mixture is supplied by the mixture-producing device (the carbureter here), the two bodies of exhaust gases (one superheated and both under pressure), and the vaporous content of the crank-case when that particular part of the structure is utilized, results in a more perfect and complete combustion; hence, it may well be that the exhaust-gases are reintroduced into the motor but once. But if they still are below the condition of combustibility and require further treatment to make them so, the system which I have provided has the capacity, and can function, to cycle those gases through the system, once or several times, for such further treatment preliminary to their being ignited in the motor.

It is a feature of my concept that I treat the fuel which is to form a constituent of the explosive-charge in such manner that it is physically modified, which facilitates subsequent vaporization and adds explosive qualities to the gaseous vapor. It also presumably changes or modifies the chemical composition of the fuel, itself, as by chemical reaction taking place between the fresh fuel and the superheated gas. In other words, I appear to generate a unique type of gas, the nature of which is, in part, indicated by the above analysis. There may be, and perhaps are, molecular changes effected in the elements, or there may be dissociation thereof, or there may be a new and/or different combination of such elements thereby produced, so that a new substance, or new substances, not heretofore utilized or known, may be the resultant of the action and functioning of the structure.

As aforementioned, the physical qualities of the fuel—comprising the integrated components specified—appear to be due to reaction between or interaction of the different types of such gases brought together in the intake-manifold. The possible, and perhaps probable, effect is that the fuel has its specific gravity materially lowered, making the same exceedingly volatile and highly explosive without deposit or even formation of carbon, so far as can be detected. I am satisfied that chemical as well as physical changes are effected by this operation.

The mingling of the hot and/or superheated gases with the gaseous-mixture, in addition to supplying a fuel-component to the explosive charge—reducing the quantity of fuel drawn through the carbureter—acts beneficially on the charge; first, heating it and increasing its volatility and combustibility; secondly, by effecting a more intimate mixing and/or integrating of the contents of the manifold; third, by converting into a gas, or more vaporized condition, the fuel drawn in through the carbureter; and, fourthly, by effecting chemical reactions as well as physical changes.

The treatment herein described of the unconsumed products of combustion has the effect of facilitating the integrating (in the intake-manifold) of the stream of exhaust-gases (of one density and temperature) and the gaseous-mixture (of a different density and temperature) from the carbureter, and tends to effect greater expansion of the column of the fuel-gas and a change in its character; hence, a highly developed and integrated column of an explosive charge is introduced into the combustion-chamber. It will be readily understood and appreciated that the introduction into the intake manifold of a large quantity of inert substances, such as unconsumed products of combustion, result in a dilution of the charge, thereby permitting higher compression in the cylinders. While in the foregoing description I have referred particularly to the introduction into the intake manifold of such inert substances from the exhaust, after reheating or superheating the same, it will be understood that it is not necessary that these products be reheated but they may be introduced from any part of the exhaust system and in any condition with resultant dilution of the charge. Thus, higher compression in the cylinders is permitted and, yet, there is no danger of preignition.

In the absence of recognizable conditions and known facts about the actions of certain of the components of my concept and the consequent lack of ascertainable information regarding certain of the results of the functioning of those components, I have herein set forth certain theories which I believe to be correct, but which I reserve the right to correct or change, if need be, as the result of further tests and analyses. For instance, I have herein described the results of subjecting certain portions of the exhaust-gases to superheating treatment as involving something in the nature of "cooking" and "cracking". I have also referred to the fact that the action of the superheating may effect mechanical and/or chemical changes in the material being superheated. If there be such mechanical and/or chemical change effected, it would appear to follow that any material thus treated would, upon intermingling, combining or integrating with the other constituents of the contents of the intake-manifold, undergo further change, which may involve a mechanical and/or chemical change, so that the resultant explosive-charge, as introduced into the combustion-chamber of the motor, would, for that reason also, be of a unique type. It is known, in any event, that the contents of the muffler, as shown by analyses thereof, are different from the usual contents of a muffler associated with a motor that is operated under similar conditions.

But whether the theories herein set forth are correct, or subject to change as the result of further developments, it may now be stated that certain basic principles and features of my concept have, in practical use thereof, demonstrated that my circulatory-system, and/or certain components thereof, function to produce a more efficient action of the motor, with consequent increased development of power therein and, likewise, with consequent economy in the operation of the same. In addition, by reason of the increased power of the motor, I find it of advantage, in developing the pressure within the system, to subject the exhaust-gases to an appreciable degree of pressure and then utilize the resultant back-pressure on the motor for the purpose of eliminating vibration thereof, etc. It will be understood, of course, that while I elect to subject the gases to a twelve-pound pressure, usually, nevertheless, the circulatory system, with the controls thereof, permit the cycling of the materials passing through the system at a higher or lower pressure. Moreover, the inherent back-pressure on the motor is not, perhaps, as high as the pressure on the material; but in any event, it is not such as materially to affect the action of the motor; in fact, it is beneficial thereto and for the reasons stated.

In those instances known to me where it has heretofore been proposed to utilize the exhaust-gases of a motor, both as a fuel and as a heating-medium, by the reintroduction of the same to the motor, it has not been attempted, so far as I am aware, to handle and treat those gases in the manner herein disclosed and whereby the volume of fresh fuel required for the motor is so materially reduced as to be almost negligible, comparatively speaking: I therefore believe myself to be the first so to utilize exhaust-gases of a motor that that motor, mounted in an automobile, say, will power the same to a very much higher mileage than heretofore, for each gallon of fuel used, such as gasoline of the type now to be purchased at any regular filling station.

To what extent any one component, alone, contributes to the result mentioned, I cannot definitely state; but practical tests have shown that my superheater, and the functioning of it to superheat certain portions of the exhaust-gases under a predetermined degree of pressure, undoubtedly contribute in a very large measure to these results, that is, to increase the power of the motor, to decrease the quantity of fresh fuel required thereby, and to improve the general working conditions of the motor.

In some instances, and in some types of motor, it may be desirable to employ, in conjunction with the usual ignition system, some means for intensifying the spark. In practice, I have found it of advantage to utilize a frequency or voltage transformer having an electrostatic capacity in conjunction with the ignition-system of a motor, and whereby an increased amount of electric energy is available for sparking purposes, with consequent augmenting of the spark production in the combustion chamber of the motor. I do not, however, regard such a device essential to the results hereinbefore specified.

Where I have herein used the terms "exhaust-gases", "spent gas", and other similar expressions, I refer to and intend to comprehend those products which are the resultant of the explosion in the motor, not only of the gaseous-mixture introduced thereinto from the carbureter or other form of mixture-producing device associated with the motor but, also, of any and all components of the explosive-charge, however constituted, and involving not only fuel and unconsumed products of combustion but, also, any gases, vapors, or even solids that may be exhausted from the motor and which are capable of being recovered or collected and then conducted back to the combustion-chamber, one or more times. These terms, and any equivalent expressions, also refer to such gases and other components, whether in their normal condition as directly exhausted from the motor, or after being handled or treated in the manner herein defined as contemplated by my inventive-concept. Similarly, the term "exhausting" and like expressions comprehend, and are intended to refer to, the normal action of the motor in relinquishing, after each explosion of the charge, the above-defined products of the explosion.

While the terms "gaseous-mixture", "fresh gaseous-mixture", "fresh fuel", and similar expressions primarily comprehend the product of a carbureter or other mixture-producing device associated with the motor; nevertheless, these terms comprehend and are intended to refer to the components—or one or more of them—which are supplied to the motor through the mixture-producing device and in contradistinction to the aforementioned gaseous and vaporous exhaust-products and the contents of the crank-case; and thereby the usual types of fuel, such as gasoline, kerosene, alcohol and similar fuels, are contemplated.

Where I have herein employed the terms "crank-case contents", "vaporous components of the crank-case contents", and similar expressions, I intend those expressions, and other similar terms, to comprehend and refer to, first, those elements or products of the crank-case susceptible of being recovered or collected and withdrawn, by the suction-action of the motor or otherwise, and which are more or less in the nature of fuel, whether in vaporous or gaseous form; secondly, any portions of the explosive-charge, exploded or unexploded, which may have escaped from the combustion-chamber into the crank-case and which are useful as fuel for introduction into the combustion-chamber, or even as a lubricant capable of reintroduction and re-use in the motor; and, third, any air—either lubricant-laden or otherwise—which (either heated, cooled, dry or moist) is adapted to intermix with fuel and support combustion in the combustion-chamber of the motor.

The terms "flaming gases", "flaming elements" and similar expressions used in conjunction with the current of products exhausted from the motor as the resultant of the explosion of a charge, comprehend and are intended to refer to, the condition of those products as they exist immediately after the explosion of the charge and while still ignited.

The terms "combustible products", "components", "constituents", "materials", "elements", and similar and equivalent terms, as herein used, contemplate any product, gas, vapor or even solid, capable of being introduced into a motor and susceptible of combustibility when exploded.

The terms "combustion", and similar and equivalent terms, are intended to comprehend the action within the combustion-chamber of the explosion of the charge therein introduced, whether such charge includes merely the aforementioned gaseous-mixture, or an admixture therewith of other components, and which produces, in complete or incomplete form, the above-defined exhaust-gases.

The terms "mixing", "admixing", "mingling", "comingling", "intermingling", "intergrating", etc., comprehend and are intended to refer to the bringing together, in the intake-manifold, or other point adjacent the combustion-chamber of the engine, of the above-defined gaseous-mixture and/or exhaust-gases and/or crank-case contents, and/or air from the atmosphere or from any other source, and which action may involve either a mechanical and/or chemical combination or association of components to constitute the charge preliminary to its introduction into the motor.

The expressions "discharging to the atmosphere", "release into the atmosphere", and similar terms, are intended to comprehend and refer not only to the usual operations of a motor to relinquish to the atmosphere certain of the products of the explosion of the motor but, also, the escaping from any portion of the exhaust-system of my structure of predetermined quantities of consumed or unconsumed products of combustion.

The term "mixture-producing device", as herein used, is intended to comprehend and refer to a carburetor, to an atomizer, or to any other suitable instrumentality or structure for forming or producing an explosive composition adapted to be introduced into a motor as an explosive-charge.

The terms "segregating", "collecting", "dividing", "recovering", and similar expressions, as herein used, are intended to comprehend and refer to the handling of the products of combustion, either in the exhaust-system of the motor or in those conduits herein described as extending from the exhaust-system and communicating with the intake-manifold as well as any conduit connecting the crank-case with the intake-manifold, and whereby gaseous, vaporous, and other forms of materials and elements which are to constitute components of the explosive-charge are recovered or separated into streams, currents, bodies or portions for individual or other treatment en route to the intake-manifold.

The term "circulatory system", as herein employed, comprehends and is intended to refer, primarily, to means for conducting the above-defined exhaust-gases, crank-case contents, etc., from and back to the combustion-chamber of the motor, and whereby the procedure of circulation is utilized to introduce or reintroduce the products of combustion, etc., into the intake-manifold to be there mingled with other components of the explosive-charge; this circulatory feature involving what is, to all practical purposes, a closed system whereby such circulation and/or re-circulation is facilitated or accomplished.

The term "cycling", as herein employed, is a feature of, and an action incident to, the provision of the circulatory-system just defined, and involves conducting or reintroducing the products of the explosion in the combustion-chamber through the system once, or as many times as may be required to effect complete combustion of the charge.

The term "superheating" and similar expressions, as herein employed, are intended to comprehend and refer to a treatment of certain streams, bodies, or portions of the exhaust-gas while in transit from the exhaust-system to the intake-manifold and whereby the gas, or certain of its components, are subjected to an intense heat, such that their temperature is materially raised above that which they ordinarily would possess when they reached the muffler, and whereby a substantial change in their character and/or their characteristics is effected, such change involving either a mechanical or chemical action or reaction, whereby their combustibility is substantially improved and, also, an additional amount of heat added thereto, this heat to be imparted to other materials introduced therewith in the intake-manifold. In connection with this action, and the structure which is utilized to superheat the exhaust-gases, I have herein used the term "cracking" by which term I mean to define the action of subjecting certain hydrocarbon materials, etc., to a high temperature while under pressure, this treatment more or less simulating the well-known gasoline-cracking operation now extensively practiced in connection with hydrocarbons.

The terms "pressure", "pressure-producing", and similar expressions, as herein used, comprehend and refer to the treatment of certain materials in the aforementioned circulatory-system whereby those materials are subjected to pressure, as produced either by the impulses of the motor through the system by action thereof, or by any other means whereby the materials within the system, or introduced thereinto from any source, have their pressure raised above normal and which, in this instance, is usually and preferably a selected pressure. The selected or predetermined degree of such pressure is accomplished with a varying degree by the action of the muffler and gas-equalizer operating in conjunction with the motor and the circulatory-system.

The term "back-pressure" as herein employed, and any similar or equivalent expression, comprehends and is intended to refer to the resultant of the impulses or suction of the motor whereby a cushioning effect is produced within the system and motor, and which is, in part at least, in consequence of subjecting the contents of the system to pressure by the pressure-producing instrumentalities referred to, and which back-pressure is utilized to advantage, in this instance, to cushion certain moving parts of the motor and thereby reduce vibration, improve the operation of the motor, etc.

The inventive-concept herein disclosed involves not only apparatus functioning to produce an explosive-charge of a unique character for an internal combustion engine; but, also, a method with which such apparatus may be employed to practice the same. This method constitutes the subject-matter of a companion application of mine, Serial No. 233,169, filed November 14, 1927, and in which I have directed claims to the method just mentioned.

What I claim is:

1. In operative association with an internal combustion engine having intake and exhaust passages, a closed circulatory line for conducting exhaust-gases from the exhaust-passage directly to the intake-passage, means for supplying a gaseous-mixture to the intake-passage, and means for effecting reaction of the exhaust-gases by subjecting the same to heat while under pressure and, then, integrating the same with said gaseous-mixture.

2. A charge-forming structure for an internal combustion engine having intake and exhaust passages, a mixture-producing device associated therewith for supplying a gaseous mixture to the intake-passage, means associated with the exhaust-passage for separating selected portions of exhaust gases flowing therethrough, conduits for separately conducting such selected portions of the exhaust-gases to the intake-passage and effecting an intermingling in the passage of the gaseous-mixture with the exhaust-gases, and means operatively associated with one of said conduits for subjecting the same to a reheating treatment.

3. A charge-forming structure for an internal combustion engine having intake and exhaust passages, a mixture-producing device associated therewith for supplying a gaseous mixture to the intake-passage, means associated with the exhaust-passage for subjecting exhaust-gases flowing therethrough to pressure, means between the passages for dividing the exhaust-gases into separate portions, conduits for conducting selected portions thereof, while still under pressure, to the intake-passage, and means associated with at least one of said conduits for subjecting its contents, while still under pressure, to a reheating treatment.

4. A charge-forming structure for an internal combustion engine having intake and exhaust passages, a mixture-producing device associated therewith for supplying a gaseous-mixture to the intake passage, means associated with the exhaust-passage for subjecting exhaust-gases flowing therethrough to pressure, means between the passages for dividing the exhaust-gases into separate portions, conduits for conducting selected portions thereof, in different volumes and while still under pressure, to the intake-passage, means associated with at least one of said conduits for subjecting its contents, while still under pressure, to a reheating treatment, and means associate with both conduits for controlling the flow of exhaust gases therethrough and functioning under the influence of the engine during its operation.

5. A charge-forming structure for producing an explosive-charge for an internal combustion engine having intake and exhaust passages, means for selectively segregating a portion of the exhaust-gases from the exhaust-passage, and means including pressure-producing and reheating instrumentalities to effect a mechanical change in the characteristics of said gases, said means being such that the gases are reheated while under pressure.

6. A charge-forming structure for producing an explosive-charge in an internal combustion engine having intake and exhaust passages, means for selectively segregating a portion of the exhaust-gases from the exhaust passage, means for subjecting said exhaust-gases to a selected degree of pressure, means for subjecting the gases while under pressure to a reheating treatment, means for producing and intermingling therewith a gaseous-mixture, and means for conducting a second selected body of exhaust gases from said exhaust passage and intermingling the same with the gaseous-mixture and the first-mentioned selected body of exhaust-gases in the intake-passage.

7. A charge-forming structure for producing an explosive charge for an internal combustion engine having intake and exhaust passages, means for selectively segregating a portion of the exhaust-gases flowing through the exhaust-passage, means for conducting the segregated portion of gases to the intake-passage, and means for treating said gases en route to the passage to effect a chemical change therein, said means including instrumentalities for subjecting the exhaust-gases to a selected degree of pressure and, also, instrumentalities for subjecting the same, while under pressure, to a relatively high degree of heat.

8. A charge-forming structure for producing an explosive-charge for an internal combustion engine having intake and exhaust passages, means for selectively segregating a portion of the exhaust-gases flowing through the exhaust-passage, means for conducting the segregated portion of gases to the intake-passage, means for treating said gases en route to the passage to effect a chemical change therein, said means including instrumentalities for subjecting the exhaust-gases to a selected degree of pressure and, also, instrumentalities for subjecting the same, while under pressure, to a relatively high degree of heat, means for conducting a second body of exhaust-gases from the exhaust to the intake-passage and intermingling the same with the contents of said passage, means for producing and conducting to said intake-passage a gaseous-mixture, a crank-case operatively associated with the engine, and means for conducting selected portions of the contents of the crank-case to the intake-passage.

9. A charge-forming structure for internal combustion engines having intake and exhaust passages, including a mixture-producing device in communication with the intake-passage to supply a gaseous-mixture thereto, means associated with the exhaust-passage for dividing the exhaust-gases into separate bodies, means for separately conducting the bodies of exhaust-gases to the intake passage, and means associated therewith for treating one of the bodies of exhaust-gases, such treatment including subjecting the same to a relatively high degree of heat.

10. A charge-forming structure for internal combustion engines having intake and exhaust passages, including a mixture-producing device in communication with the intake-passage to supply a gaseous-mixture thereto, means associated with the exhaust-passage for dividing the exhaust-gases into separate bodies, means for separately conducting the bodies of exhaust-gases to the intake-passage, and means associated therewith for treating one of the bodies of exhaust-gases, such treatment including subjecting the same to an appreciable degree of pressure and, then, to a relatively high degree of heat.

11. A charge-forming structure for internal combustion engines, a circulatory system in communication therewith for cycling exhaust-gases therethrough and including intake and exhaust passages, a plurality of conduits communicating with said passages, and means for independently controlling the cycling flow of the gases through each of the conduits.

12. A charge-forming structure for internal combustion engines, a circulatory-system in communication therewith for cycling exhaust-gases therethrough and including intake and exhaust passages, a plurality of conduits communicating with said passages, self-governed means for independently controlling the cycling flow of the gases through each of the conduits, means associated with at least one of said conduits for subjecting the gases to reheating treatment whereby their chemical character and mechanical characteristics are changed, and means for producing a gaseous-mixture and admixing the same with the reheated body of exhaust-gases, at least one of said conduits operating to convey untreated exhaust-gases to the point of admixing of the mixture and superheated gases.

13. A charge-forming structure for internal combustion engines, including a circulatory system in communication therewith for cycling exhaust gases therethrough, means for dividing said gases into a plurality of bodies, conduits for conveying a plurality of said bodies to a selected admixing point, means associated with at least one of said conduits for effecting reheating treatment of its contained body of exhaust-gas, a mixture-producing device operatively associated with the engine and operating to deliver a gaseous-mixture to the admixing point for combination, there, with the reheated exhaust gas, and means for independently controlling the flow of the gaseous-mixture to said point and of the exhaust gases through said conduits.

14. A charge-forming structure for internal combustion engines, including a circulatory system in communication therewith for cycling exhaust-gases therethrough, means for dividing said gases into a plurality of bodies, conduits for conveying a plurality of said bodies to a selected remixing point, means associated with at least one of said conduits for effecting reheating treatment of its contained body of exhaust gas, and means for inducing pressure within the system whereby said gas flows through the conduits under pressure.

15. A charge-forming structure for internal combustion engines, including a circulatory-system in communication therewith for cycling exhaust gases therethrough, means for dividing said gases into a plurality of bodies, conduits for conveying a plurality of said bodies to a selected admixing point, means associated with at least one of said conduits for effecting reheating treatment of its contained body of exhaust gas, a mixture-producing device operatively associated with the engine and operating to deliver a gaseous-mixture to the admixing point for combination, there, with the reheated exhaust-gas, means for independently controlling the flow of the gaseous-mixture to said point and of the exhaust-gases through said conduits, an intake-manifold communicating with the engine and adapted to receive the gaseous mixture and exhaust-gases as distinct entities, means for inducing pressure within the system whereby said gases flow through the conduits under pressure, and self-controlled means for controlling the flow of the gases through said conduits and maintaining pressure therein, one of the conduits being of larger capacity than another whereby a relatively large volume of untreated exhaust gas is conducted to the admixing point.

16. A charge-forming structure for internal combustion engines, intake and exhaust passages communicating therewith, a plurality of conduits in communication with the intake-passage, means associated with the exhaust-passage for trapping selected portions of the exhaust-gases flowing therethrough and supplying the same to one of said conduits, means for subjecting the gases conveyed therethrough to a reheating treatment, and means for automatically controlling the passage of gases through another of said conduits, whereby a predetermined volume thereof is delivered into the intake passage.

17. In combinative association, an internal combustion engine having intake and exhaust manifolds; a mixture-producing device for supplying a fresh gaseous-mixture to the intake-manifold and having an air-intake; means for heating air for introduction to said intake; a muffler juxtaposed adjacent one end of the exhaust-manifold; a gas-trap within the muffler and whereby exhaust-gases passing through the muffler are selectively divided into portions; and a conduit in communication with the trap and the intake-manifold and extending at least for a portion of its length through the exhaust-manifold whereby its contents are reheated by the flowing gases therein.

18. In combinative association, an internal combustion engine having intake and exhaust manifolds; a mixture-producing device for supplying a fresh gaseous-mixture to the intake manifold and having an air intake; means for heating air for introduction to said intake; a muffler juxtaposed adjacent one end of the exhaust-manifold; a gas-trap within the muffler and whereby exhaust-gases passing through the muffler are selectively divided into portions; a conduit in communication with the trap and the intake-manifold and extending at least for a portion of its length through the exhaust-manifold whereby its contents are reheated by the flowing gases therein; and a second conduit in communication with the muffler and intake-manifold for conducting a portion of the exhaust gases thereto.

19. In combinative association, an internal combustion engine having intake and exhaust manifolds; a mixture-producing device for supplying a fresh-gaseous-mixture to the intake-manifold and having an air-intake; means for heating air for introduction to said intake; a muffler juxtaposed adjacent one end of the exhaust-manifold; a gas-trap within the muffler and whereby exhaust-gases passing through the muffler are selectively divided into portions; a pressure-producing device associated with the muffler for subjecting the exhaust-gases therein to a predetermined pressure; and a conduit in communication with the trap and the intake-manifold and extending at least for a portion of its length through the exhaust-manifold whereby its contents are reheated by the flowing gases therein.

20. In combinative association, an internal combustion engine having an intake-member and an exhaust conduit; a mixture-producing device for supplying a fresh gaseous-mixture to the intake-manifold and having an air-intake; means for heating air for introduction to said intake; a muffler juxtaposed adjacent one end of the exhaust-conduit; a gas-trap within the muffler and whereby exhaust-gases passing through the muffler are selectively divided into portions; a pressure-producing device associated with the muffler for subjecting the exhaust-gases therein to a predetermined pressure; a conduit in communication with the trap and the intake-manifold and extending at least for a portion of its length through the exhaust-conduit whereby its contents are reheated by the flowing gases therein; a second conduit in communication with the muffler and intake-manifold for conducting a portion of the exhaust-gases thereto; and individual control-instrumentalities on each conduit for governing the volume of exhaust-gases passing therethrough.

21. In combinative association, an internal combustion engine having an intake manifold and an exhaust-conduit; a mixture-producing device for supplying a fresh gaseous-mixture to the intake-manifold and having an air-intake; means for heating air for introduction to said intake; a muffler juxtaposed adjacent one end of the exhaust-conduit; a gas-trap within the muffler and whereby exhaust-gases passing through the muffler are selectively divided into portions; a pressure-producing device associated with the muffler for subjecting exhaust-gases therein to a predetermined pressure; a pressure-equalizer associated therewith for maintaining a predetermined degree of pressure on the gases; and a conduit in communication with the trap and the intake-manifold and extending at least for a portion of its length through the exhaust-conduit whereby its contents are reheated by the flowing gases therein.

22. In combination, an internal combustion engine having intake and exhaust passages, a charge-forming structure in operative communication therewith, a mixture-producing device for supplying a gaseous mixture to the intake-passage; and means for preventing production of and/or for eliminating of certain chemical constituents including hydrogen and methane.

23. In combination, an internal combustion engine having intake and exhaust passages, a charge-forming structure in operative communication therewith, a mixture-producing device for supplying a gaseous mixture to the intake-passage; means for preventing production of and/or for eliminating of certain chemical constituents including hydrogen and methane; and means for substantially reducing the normal carbon-monoxid content of exhaust-gases.

24. In combination, an internal combustion engine having intake and exhaust passages, a charge-forming structure in operative communication therewith, a mixture-producing device for supplying a gaseous mixture to the intake-passage; means for preventing production of and/or for eliminating of certain chemical constituents including hydrogen and methane; and means for substantially increasing the oxygen-content of the gases and, also, reducing the normal carbon-monoxid content thereof and, likewise, the carbon-dioxid content of such gases.

25. A charge-forming structure for an internal combustion engine, which is provided with intake and exhaust passages, in combinative association therewith, a mixture-producing device for supplying a fresh gaseous-mixture to the intake-passage; and means in communication with the passages for cycling exhaust-gases therethrough including a plurality of conduits in communication with the passages, at least one of which conduits is in part at least mounted within the flaming portion of the exhaust-passage whereby its contents are reheated, each of said conduits being provided with a balanced-valve operating under the influence of the passing gases and controlling the introduction thereof into the intake-passage; means for subjecting the cycling gases to a predetermined pressure at predetermined stages of their travel between the intake and exhaust passages; and means for selectively separating a certain portion of the exhaust-gases and releasing it from the exhaust passage.

26. A charge-forming structure for an internal combustion engine having intake and exhaust passages, in combinative association, a mixture-producing device for supplying a gaseous-mixture to the intake-passage; a conduit between the passages for supplying exhaust-gases to the intake-passage; a muffler and pressure-producing device juxtaposed to the exhaust-passage for trapping predetermined portions of the exhaust-gases and subjecting them to a predetermined degree of pressure; and means for maintaining the contents of the muffler under substantially uniform pressure.

27. A charge-forming structure for an internal combustion engine having intake and exhaust passages, in combinative association, a mixture-producing device for supplying a gaseous-mixture to the intake-passage; a conduit between the passages for supplying exhaust-gases to the intake passage; a muffler and pressure-producing device juxtaposed to the exhaust-passage for trapping predetermined portions of the exhaust gases and subjecting them to a predetermined degree of pressure; means for maintaining the contents of the muffler under substantially uniform pressure; and means for releasing certain of the contents of the muffler into the atmosphere.

28. A charge-forming structure for an internal combustion engine having intake and exhaust passages, in combinative association, a mixture-producing device for supplying a gaseous-mixture to the intake-passage; a conduit between the passages for supplying exhaust-gases to the intake-passage; a muffler and pressure-producing device juxtaposed to the exhaust-passage for trapping predetermined portions of the exhaust gases and subjecting them to a predetermined degree of pressure; means for maintaining the contents of the muffler under substantially uniform pressure; means for releasing certain of the contents of the muffler into the atmosphere periodically and when the pressure of the gases reaches a predetermined maximum; and means for subjecting the exhaust-gases to a reheating treatment while under pressure and en route to the intake-passage to change their characteristics materially as well as to raise their temperature substantially whereby they may impart heat to the contents of the intake passage.

29. In operative combination with an internal combustion engine having intake and exhaust passages, a charge-forming structure including a closed direct conduit for conducting exhaust-gases from one to the other passage, and means for effecting a reaction of such gases by subjecting the same to a relatively high degree of heat.

30. In operative combination with an internal combustion engine having intake and exhaust passages, a charge-forming structure including a closed conduit for conducting exhaust-gases directly from one to the other passage, and means for effecting a reaction of such gases by subjecting the same to a controlled and constant degree of pressure.

31. In operative combination with an internal combustion engine having intake and exhaust passages, a charge-forming structure including a closed conduit for conducting exhaust-gases from one to the other passage, and means for effecting a reaction of such gases by subjecting the same to a relatively high degree of heat and a controlled degree of pressure.

32. A charge-forming structure for internal combustion engines having intake and exhaust passages, means for selectively segregating and isolating a portion of the exhaust-gases flowing through the exhaust-passage, means for treating said selected isolated portion of exhaust-gases to effect a mechanical change in the characteristics thereof, and means for conducting the treated gases to the intake-passage.

33. A charge-forming structure for internal combustion engines, a circulatory system in operative connection therewith, including intake and exhaust passages in communication with the engine, a closed conduit in communication with the passages for isolating and conveying exhaust-gases from one to the other, and means for subjecting said gases to heat treatment en route to the intake passage.

34. A charge-forming structure for internal combustion engines, a circulatory system in operative connection therewith, including intake and exhaust passages in communication with the engine, a conduit in communication with the passages for conveying exhaust gases from one to the other, and means for subjecting said gases to reheating treatment en route to the intake passage, said reheating means comprising a portion of the exhaust passage wherein are present flaming gases discharged from the engine.

35. A charge-forming structure for internal combustion engines, a circulatory system in communication therewith and including means for isolating and cycling exhaust-gases therethrough, and means for subjecting said isolated gases to a reheating treatment en route through the system whereby their combustibility is augmented.

36. A charge-forming structure for internal combustion engines, a closed circulatory system in communication therewith and including means for isolating and cycling exhaust-gases therethrough, a gaseous-mixture-producing device operatively associated with the engine and in communication with the system, and means for effecting a mechanical and/or chemical combination between said isolated gases and the gaseous-mixture.

37. In an internal combustion engine having intake and exhaust passages, a circulatory line directly connecting the intake and exhaust passages for cycling exhaust-gases back to and through the engine, and means including a pressure-relief port in the line to create and maintain a constant pressure on the gases flowing through the line, the line being closed so as to maintain said pressure between and at the exhaust and intake of the engine, the pressure being effective to reduce the vacuum at the intake, provide a back pressure against the engine exhaust and cushion the reciprocating parts of the engine.

38. In combination, an internal combustion engine and a charge forming structure therefor including means for confining and reheating unmixed exhaust-gases and a closed circulatory system for cycling the reheated gases back to and through the engine.

39. In apparatus for supercharging an internal combustion engine having exhaust and inlet conduits, the combination with means in said exhaust conduit for throttling the exhaust gases to control the escape thereof, of a conduit connecting said inlet conduit with said exhaust conduit intermediate the engine and said means whereby a portion of the exhaust gases are returned to the engine under pressure obtained by throttling, and means connected with said inlet conduit for introducing fuel and combustion supporting gas therein.

CHARLES J. WEEKS.